Jan. 24, 1956 S. G. SHAND 2,732,170
VALVES
Filed May 22, 1951 3 Sheets-Sheet 1
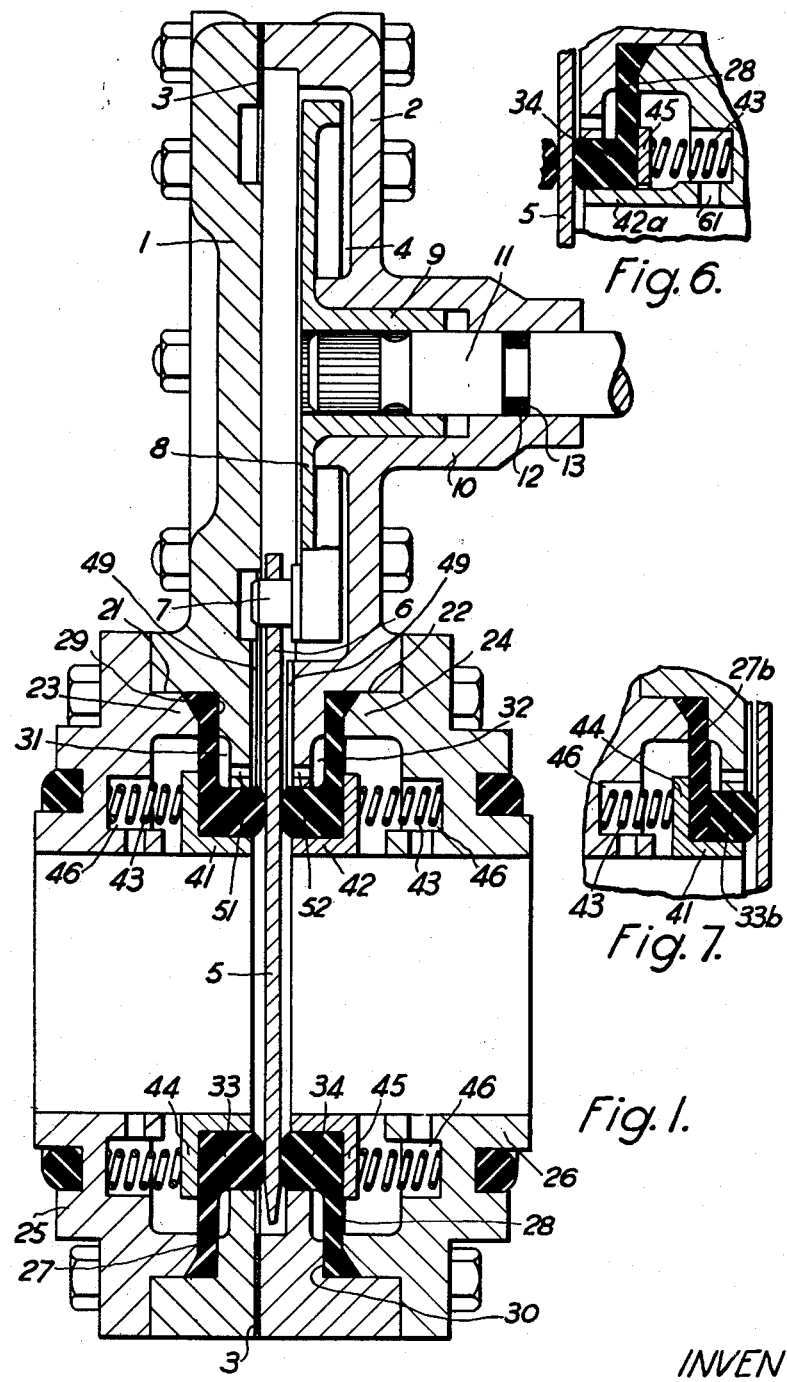
INVENTOR
Stanley Grapes Shand
BY *A. E. Odell*
ATTORNEY

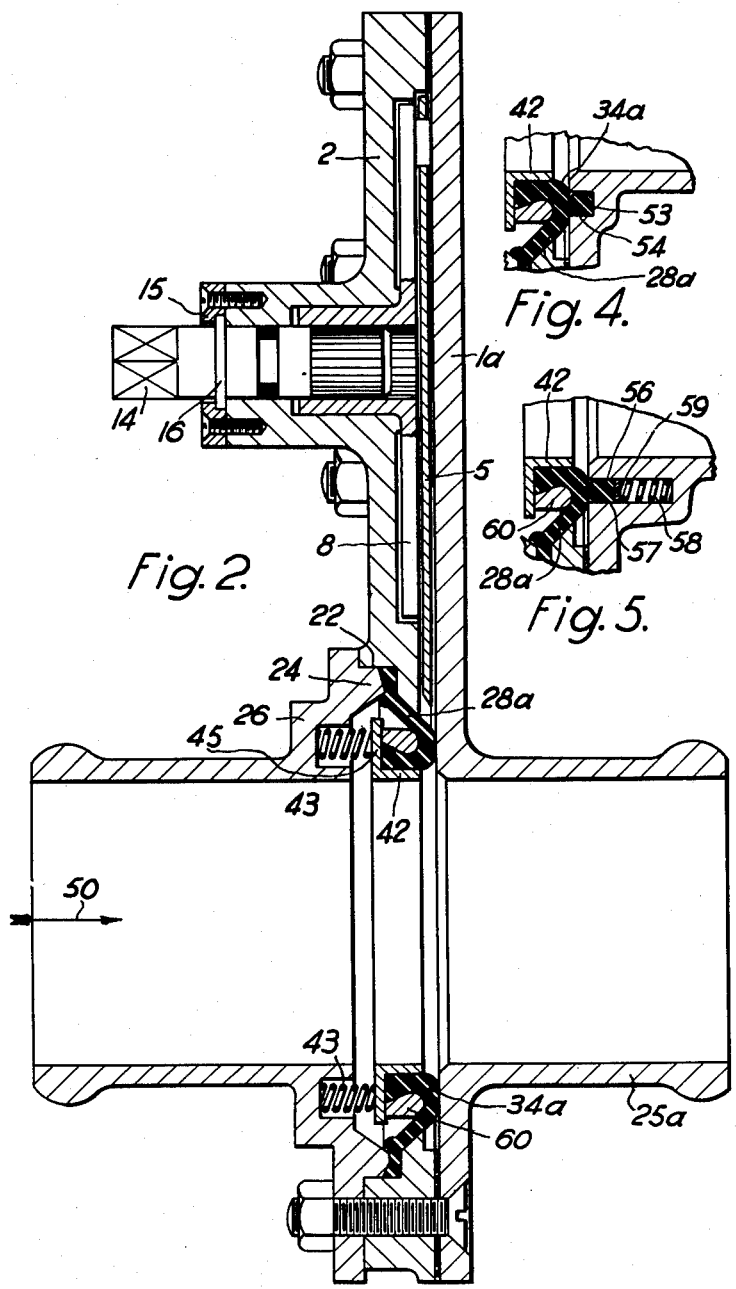

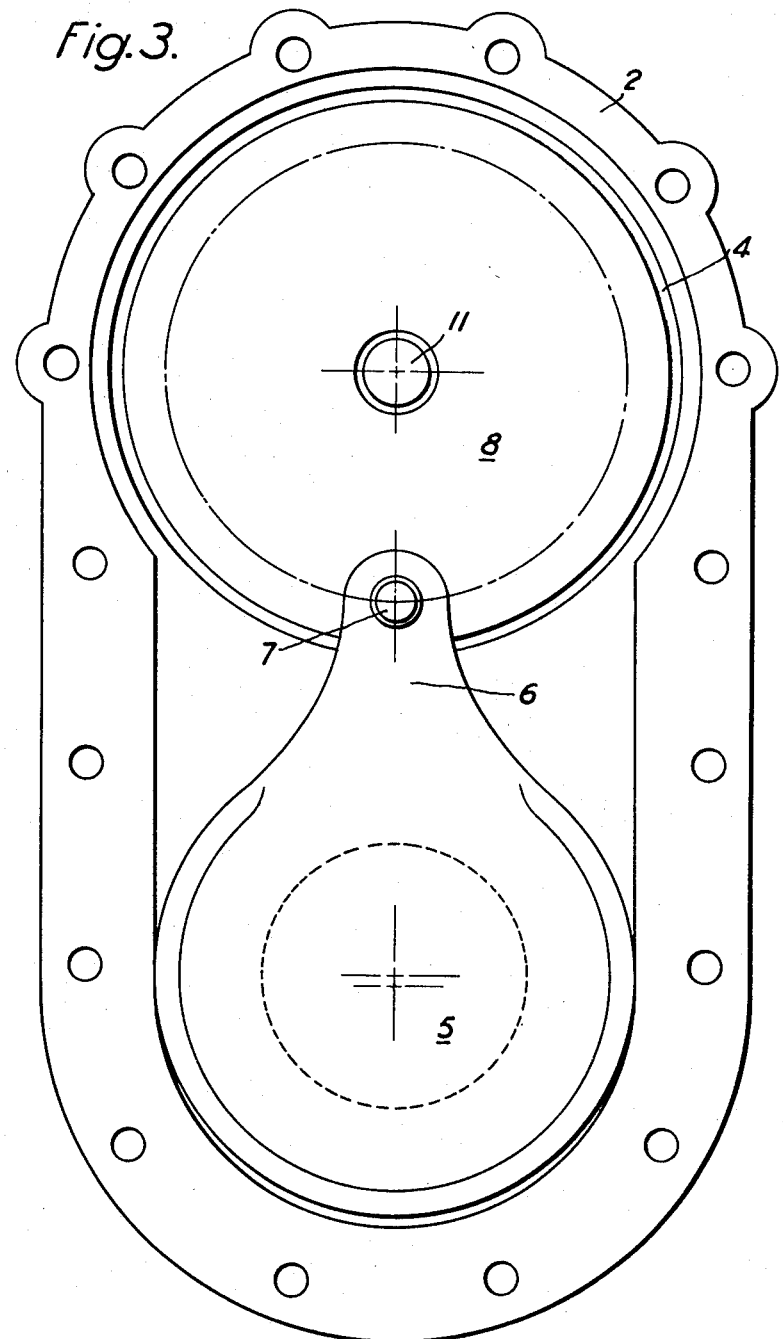

United States Patent Office 2,732,170
Patented Jan. 24, 1956

2,732,170

VALVES

Stanley Grapes Shand, Cwmbran, Newport, England, assignor to Saunders Valve Company Limited, Cwmbran, Newport, England, a British company Application May 22, 1951, Serial No. 227,550

18 Claims. (Cl. 251—172)

This invention relates to gate valves of the type in which a thin gate of constant thickness (except for a bevelled edge) moves past at least one sealing ring of resilient rubber-like material which surrounds one port in the valve body and is pressed towards the other port by springs so that when the valve is closed it is pressed against the gate and when the valve is open it is pressed against a countersurface in the valve body or another similar sealing ring, while in intermediate positions, owing to its resilient nature and the bevelling of the edge of the gate it still makes a good joint where it crosses the edge of the gate.

In the known valves of this type with two rings, the rings are simply lodged in grooves in the valve body, so that in any event if the fluid pressure on the upstream side exceeds a value depending on the spring pressure, fluid passes into the valve body in which the operating mechanism is enclosed and which is usually assembled on a plane coplanar with one face of the gate. It has been the practice however to relieve the recess in which the springs are housed by slots into the upstream bore to prevent the sealing ring from being hydraulically locked in its groove, so that the fluid always has access to the body from the upstream side of the valve. Thus the effective seal is on the downstream side, towards which side the fluid pressure presses the gate when the gate is closed and the part of the valve body in which the operating mechanism is enclosed is filled with the fluid under pressure. Accordingly, the gland by which the projecting operating spindle must be sealed to the body can only be repaired or repacked or the spindle be withdrawn with the line empty or with the valve entirely removed from the line.

According to the present invention, in a valve of the type above set forth, at least one sealing ring is provided which is sealed to the valve body as well as making joint under spring pressure with a countersurface (which may be a surface of the valve body, or of a resilient ring or of another similar sealing ring sealed to the valve body) when the valve is open, partly with the countersurface and partly with the gate when the valve is partly open and with the gate when the valve is closed. The valve is intended to be used with the ring on the upstream side in which case the ring seals off the operating mechanism for the controlled fluid at all positions of the gate. Advantageously the sealing to the body is arranged so that the fluid pressure can act to press the ring against the gate. A suitable way of achieving these ends is to seal the or each ring to the body by a flexible diaphragm, to the back of which the fluid on the same side of the gate has access. As the valve is sealed on the upstream side of the gate the spindle is not exposed to pressure; a gland is desirable however, but if the general construction allows the spindle can be withdrawn or the gland be repacked without emptying the line. Also the pressure producing the seal between the ring and the gate being in part derived from the pressure is suited to the operating conditions. The actual value of that part of the sealing pressure due to fluid pressure will depend on the area of the diaphragm effective to transmit the fluid pressure and this can be designed as desired. When the valve is open the or each ring is sealed against the countersurface again by a pressure which depends on the fluid pressure, and there is no possibility of leakage around the back of the or either ring.

The diaphragm may be sealed to the body by clamping its extreme margin; this margin and the space within which it is clamped may be of dovetail or similar section to obtain volume compression of the material, so forcing its edge surface, which is not directly clamped, against the surface of the body bounding this part of the clamping space and improving the joint. The ring may be integral with its diaphragm. If the ring is guided on its outer periphery and a space is left to permit movement of the diaphragm, trapping in this space of any fluid which may leak past the ring may be avoided by suitably venting the space. Alternatively the ring and diaphragm may be made separate and the parts arranged so that the spring pressure normally holds the two in contact; then if there should be any liquid trapped in the body space and its pressure rises excessively due to temperature changes, the excess pressure will be relieved to the downstream side between the ring and diaphragm.

When only a single spring-pressed, body-sealed sealing ring is provided, because it must be on the upstream side the flow must always be in the same direction. The countersurface may as above mentioned be a surface on the body itself or it may be another resilient ring simply lodged in a groove in the body or lodged in a groove and spring-pressed, on the downstream side of the gate, against which the sealing ring makes joint when the valve is open.

The material of the diaphragms and rings will generally be rubber or synthetic rubber, the precise quality and resilience depending on the nature and pressure of the fluid (e. g. hydrocarbon fuel) to be controlled. The gate is, as usual, of polished metal. When there is a sealing ring on one side only, the gate will be bevelled on that side, though if a resilient countersurface is used, there should also be a bevel on the other side. When there is a sealing ring on both sides, the gate will be bevelled on both sides.

The invention will be further described with reference to the accompanying drawings in which:

Figure 1 is an axial section of an example suitable for flow in either direction and Figure 2 is an axial section of an example suitable for flow in one direction only.

Figure 3 is a face view showing the operating mechanisms used in the above two valves.

In Figures 1 and 2, two different forms of sealing ring and diaphragm are shown; Figures 4 to 7 are detail sections illustrating, but not exhausting, variations including other possible forms of sealing ring.

In Figures 1, 2 and 3 like parts bear the same references, and so far as they are similar in construction, will for convenience be described together. In both examples, the body comprises two parts 1, 2 assembled on a plane with thin interposed packing 3. The part 2 has a recess 4 in which the operating gear is accommodated and into which the gate 5 retracts when the valve is open.

The operating mechanism illustrated is of the known kind in which an extension 6 on the gate is engaged by a crank pin 7 so that under the confining effect of the body at the sides of the gate, see Figure 3, the movement of the gate is one of combined reciprocation and rotation. In Figures 1 and 3 the valve is shown closed, in Figure 2 open. The crank pin 7 is conveniently carried by a disc 8 to reduce the unoccupied volume of the recess 4. The disc has a central boss 9 journalled in a boss 10 in the body part 2, and a spindle 11 for the disc projects through this part 2 for external operation. The spindle 11 is packed where it passes through the boss 10, but since as above explained, the valve according to the invention is sealed on the upstream side, the packing need be no more than one or two rubber rings such as 12 each lodged in a groove 13 in the spindle 11 and bearing against the bore of the boss 10. In both cases the spindle 11 is shown splined to the disc 8. In Figure 1 it is assumed that the spindle is to be rotated by some mechanism (such as an electric motor and gear box) which will retain the spindle endwise, while in Figure 2 the spindle has a square 14 on the end to receive means for rotating it, e. g. a hand lever and is retained by a recessed ring 15 held by screws to the boss and engaging a shoulder 16 on the spindle. In either case if the retaining means is disengaged the spindle can simply be withdrawn endwise for removal of the packing or any other purpose, without removing the valve from the line or even emptying the line.

In Figure 1, each of the parts 1, 2 is recessed at 21, 22 respectively, to receive spigots 23, 24 respectively on annular fittings 25, 26 which are bolted in position, define the bore through the valve and serve for its connection in a pipe line or the like. Respective flexible fluid tight diaphragms 27, 28 are clamped by their margins between the spigots and the bases 29, 30 of the recesses 21, 22 the spigots being bevelled to correspond with the dovetail section of the diaphragm margins, which are thus put under volume compression, improving the seal. Within the clamped margin the bases 29, 30 are hollowed out at 31, 32 to leave room for the diaphragm to move under the fluid pressure which has access to the back of it as described below. As shown the bases 29, 30 are plane and the width of these plane bases against which the diaphragm margins are clamped reduces the area of the diaphragm which is effective to transmit pressure to the actual sealing ring, marked 33, 34 respectively and enables this pressure to be reduced if desired without inconveniently reducing the outer diameter of the diaphragm.

The parts 1, 2 terminate just clear of the outer diameter of the ring 33, 34, and internally the rings are supported by sleeves 41, 42 respectively. Spring pressure on each ring is provided by a series of compression springs 43 behind the ring in direct line with it, acting upon it through a respective flat metal ring 44 or 45 to spread the pressure all round. Conveniently the rings 44, 45 are in one piece with the respective sleeves 41, 42. The springs 43 are accommodated in pockets 46 in the annular fittings 25, 26. The fittings 25, 26 are recessed within the spigots 21, 22 and the recesses are clear of the rings 44, 45 so that the fluid has access to the backs of the diaphragms. Since the pressure on the ring is equal to the sum of the pressure of the springs 43 and the value of the fluid pressure on the annular area between the bore of the sleeves 41, 42 and the periphery of the recesses in the spigots 21, 22, when the valve is closed the ring on the upstream side makes the seal and so fluid only passes between the ring and the gate so far as the seal is imperfect. The gate is as usual bevelled so that when partly open the two rings seal together without gap, while when the valve is open, the two rings seal together all round. To prevent any fluid which does get past the ring on either side from being trapped in the hollows 31, 32 bores 51, 52 lead from these hollows to the space between the parts 1 and 2. Similarly to prevent trapping in the recess 4 due to the pushing of the gate over to one side or the other under the fluid pressure when the gate is closed, both members 1 and 2 are grooved as at 49. If there is a rise of temperature causing any fluid in the hollows 31, 32 or in the recess 4 to expand, it can force its way back between the rings and gate, and will not reach the undesirably high value which would be necessary for it to force its way between the bosses 9, 10 and past the packing 13, and which might endanger the valve body 1, 2.

In Figure 2, since only flow in one direction (indicated by the arrow 50) is contemplated a sealing ring and associated parts are only required on the upstream side. Those parts on this side which are substantially identical with Fig. 1 have been marked with the same references namely 2, 22, 24, 26, 42, 43 and 45. Certain other parts on this side correspond but are of different form and have therefore been given suffixed references. These are the diaphragm 28a and ring 34a; the diaphragm is here coned and no recess and bores corresponding to 32, 52 are necessary.

On the other side, the body part 1a and the fitting 25a (corresponding to 1, 25 in Fig. 1) are in one piece, the part 1a simply being flat, while the gate 5 slides against the part 1 and is bevelled on one side only. When the valve is closed the ring seals against the gate, when it is partly open, the ring seals partly against the gate and partly against the flat surface of the part 1a the bevel on the gate avoiding any gap in the seal and when the valve is open the ring seals wholly against the flat surface of part 1a. Thus at all times the space in which the operating mechanism is enclosed is always sealed off from the bore through the valve.

Instead of sealing against the flat surface of the part 1a when the valve is partly or wholly open, a ring of resilient rubber or like material can be provided in this surface. Thus as shown in Fig. 4, there may simply be a D-section ring 53 in an annular groove 54. Or as shown in Fig. 5, there may be a D-section ring 56 in a groove 57, backed by springs 58 acting through a pressure distributing ring 59.

The diaphragm and ring can take various forms. Thus in Figure 1 a flat diaphragm is shown and in Figure 2 a conical diaphragm. Again in Figure 1 a D-section ring is shown, while in Figure 2 the ring is of hollow section and is more flexible; to support and maintain the shape of the ring during the opening and closing movement, a metal ring 60 of corresponding section is lodged in the hollow. It is to be understood that these and other possible variations of form are not confined respectively to valves for flow in either direction and valves for flow in one direction only.

Another detail variation is shown in Figure 6. Here the ring, as shown for example of the same section as in Figure 1 but not so limited, is internally supported not by a sleeve integral with the ring 45, but by a sleeve 42a which is part of the fitting 26, access for the fluid pressure to the back of the diaphragm being through bores 61. The use of a sleeve integral with the ring 45 is usually to be preferred however, as then the sleeve moves with the ring and there is less tendency for the ring to be deflected into the space between the inner end of the sleeve and the gate when the valve starts to close.

Figure 7 shows another method of providing thermal relief, i. e. relief of pressure due to expansion under temperature rise of any fluid which may get past the sealing ring. In this case the diaphragm 27b is separate from the sealing ring 33b, but the springs 43 normally press the two into close, sealing contact. If however the pressure of fluid in the space for the operating mechanism rises sufficiently, the fluid will force its way between the diaphragm and ring; thus the springs 43 and diaphragm as well as fulfilling their functions in sealing the gate, serve as a thermal relief valve. It will be noted that this and other forms of thermal relief provided by the present invention and described above all discharge within the sealed system and thus avoid the hazard of external discharge in the case of volatile fuels as in aircraft fuel systems.

I claim:

1. In a gate valve of the type comprising a body with a through bore, a bevel-edged gate in the body and operating mechanism for the gate also within the body, the combination of at least one flexible resilient sealing ring surrounding the bore and a counter-surface therefor, the ring being on one side of the gate and the counter-surface on the other, means sealing the ring to the valve body, and spring means pressing the ring towards the gate, the bevel angle of the gate and the flexibility and resilience of the ring being so related that the ring makes joint with the counter-surface when the valve is open, partly with the counter-surface and partly with the gate when the valve is partly open, and with the gate when the valve is closed, so that when the valve is used with the ring on the upstream side, the ring seals off the operating mechanism from the controlled fluid at all positions of the gate.

2. A gate valve as set forth in claim 1 also comprising means whereby when the valve is in use with the ring on the upstream side and is closed, the fluid pressure on the upstream side can act to assist in pressing the ring against the gate.

3. An annular gate valve as set forth in claim 1 comprising a flexible diaphragm having one margin connected fluid tight to said ring and the other margin connected fluid tight to the valve body whereby said ring is sealed to the valve body.

4. A gate valve as set forth in claim 3 wherein the fluid pressure from the same side of the gate has access to the back of the diaphragm.

5. A gate valve as set forth in claim 1 wherein the means sealing said ring to the body comprises a flexible diaphragm connected fluid tight to the ring and sealed to the body by clamping its extreme margin.

6. A gate valve as set forth in claim 5 in which the clamped margin of the diaphragm is of dovetail or similar section whereby it is put in volume compression.

7. A gate valve as set forth in claim 5 in which the diaphragm is integral with the ring.

8. A gate valve as set forth in claim 1 comprising a flexible diaphragm whereby said ring is sealed to the valve body, means guiding the outer periphery of the ring, a space being left in the body for the movement of the diaphragm and the space being vented to prevent trapping therein of any fluid which leaks past the ring.

9. A gate valve as set forth in claim 1 wherein said ring is of D section.

10. A gate valve as set forth in claim 1 wherein said ring is of hollow section, the valve also comprising a metal ring of corresponding section lodged in each hollow.

11. A gate valve as set forth in claim 1 also including for said ring a metal sleeve and a flat ring integral with one another, the sleeve supporting the ring on its inner periphery and the flat ring serving to transmit the spring pressure to the ring.

12. A gate valve as set forth in claim 1 wherein the means sealing said ring to the body comprises a flexible diaphragm sealed to the body and pressed normally into sealing contact with the ring by the said spring means.

13. A gate valve as set forth in claim 1 having a sealing ring on either side of the gate, each ring constituting the counter-surface for the other.

14. In a gate valve of the type comprising a body with a through bore, a bevel-edged plate constituting a gate in the body, and operating mechanism for the gate also within the body, the combination of two flexible resilient sealing rings of equal diameter surrounding the bore one on either side of the gate, means sealing each ring to the body, and spring means pressing each ring towards the gate, the bevel angle of the gate and the flexibility and resilience of the rings being so related that the rings make joints partly with the gate and partly with one another when the valve is partly open.

15. A gate valve as set forth in claim 14 comprising a flexible diaphragm for each ring whereby it is sealed to the body.

16. A gate valve as set forth in claim 15 wherein the fluid pressure on each side of the gate has access to the back of the diaphragm on that side.

17. In a gate valve of the type comprising a body with a through bore, a bevel-edged plate constituting a gate in the body, and operating mechanism also within the body, the combination of a flexible resilient sealing ring surrounding the bore on one side of the gate, a counter-surface for the ring in the body on the other side of the gate, means sealing the ring to the valve body and spring means pressing the ring towards the gate and counter-surface, the bevel angle of the gate and the flexibility and resilience of the ring being so related that the ring makes joint partly with the gate and partly with the counter surface when the valve is partly open.

18. A gate valve as set forth in claim 17 in which the counter-surface is a surface of the body itself, the means sealing the ring to the body comprising a diaphragm sealed to the body, and the fluid pressure on the same side of the gate on the ring having access to the back of the diaphragm.

References Cited in the file of this patent

UNITED STATES PATENTS

| 1,502,473 | Joule | July 22, 1924 |
| 1,567,537 | Mockus | Dec. 29, 1925 |
| 1,836,976 | Krause | Dec. 15, 1931 |
| 2,000,853 | Lang | May 7, 1935 |
| 2,063,655 | Barner | Dec. 8, 1936 |
| 2,218,145 | Clayten | Oct. 15, 1940 |
| 2,370,751 | Prager | Mar. 6, 1945 |
| 2,542,254 | Lamb | Feb. 20, 1951 |
| 2,597,474 | Griffith | May 20, 1952 |
| 2,660,398 | Bashark | Nov. 24, 1953 |

FOREIGN PATENTS

| 324,654 | Germany | of 1915 |
| 315,469 | Great Britain | July 15, 1929 |
| 802,407 | France | of 1936 |